(12) United States Patent
Rubbiero et al.

(10) Patent No.: US 8,314,925 B2
(45) Date of Patent: *Nov. 20, 2012

(54) FIBER-OPTIC BASED THRUST LOAD MEASUREMENT SYSTEM

(75) Inventors: Eric John Rubbiero, Rensselaer, NY (US); Bala Corattiyil, Cincinnati, OH (US); Frederic Gardner Haaser, Cincinnati, OH (US); Scott Francis Wolfer, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/609,546

(22) Filed: Oct. 30, 2009

(65) Prior Publication Data

US 2011/0102765 A1     May 5, 2011

(51) Int. Cl.
*G01B 11/16* (2006.01)
(52) U.S. Cl. ............................................. 356/32; 356/35
(58) Field of Classification Search .................... 356/32, 356/35; 385/10, 12, 13, 37
See application file for complete search history.

(56) References Cited

U.S. PATENT DOCUMENTS

| | | | |
|---|---|---|---|
| 5,735,666 A | 4/1998 | Johnston | |
| 5,952,587 A | 9/1999 | Rhodes et al. | |
| 6,141,087 A | 10/2000 | Viel | |
| 6,304,686 B1 | 10/2001 | Yamate et al. | |
| 6,490,378 B2 * | 12/2002 | Walter et al. | 385/13 |
| 7,430,926 B2 | 10/2008 | Haaser et al. | |
| 2005/0253051 A1 | 11/2005 | Hwang et al. | |
| 2007/0186687 A1 | 8/2007 | Haaser et al. | |
| 2009/0087303 A1 | 4/2009 | Ruggiero et al. | |

FOREIGN PATENT DOCUMENTS

JP     59163531 A     9/1984

OTHER PUBLICATIONS

"An optical system with potential for remote health monitoring of subsea machinery", D A Jackson, Measurement Science and Technology, v 20, n 3, 2009.
"Bearing load analysis and control of a motorized high speed spindle", Jenq-Shyong Chen and Kwan-Wen Chen, Department of Mechanical Engineering, National Chung-Cheng University, Taiwan, ROC (2005).
"Fiber Bragg grating sensors for structural health monitoring of Tsing Ma bridge: Background and experimental observation", Chan T. H. T; Yu L; Tam H. Y; Ni Y. Q; Liu S. Y.; Chung W. H.; Cheng L K.,Engineering structures ISSN 0141-0296, vol. 28, No. 5, pp. 648-659 (2006).
"Long-term monitoring FBG-based cable load sensor", Zhang, Zhichun; Zhou, Zhi; Wang, Chuan; Ou, Jinping, Proceedings of SPIE—The International Society for Optical Engineering, v 6167, 2006, Smart Structures and Materials 2006: Smart Sensor Monitoring Systems and Applications (2006).
EP10189083 Search Report Feb. 21, 2011.

* cited by examiner

*Primary Examiner* — Layla Lauchman
(74) *Attorney, Agent, or Firm* — Penny A. Clarke

(57) ABSTRACT

A fiber-optic based thrust load measurement system is coupled to a bearing housing. The measurement system includes at least one fiber optic sensor configured to detect one or more parameters related to the bearing housing. An optical coupler is configured to regulate light signals emitted from a light source and light signals reflected from the fiber optic sensor. A detector system is configured to receive light signals from the optical coupler. A processor is configured to receive an output from the detector system and to determine a thrust load on a thrust bearing based on the detected one or more parameters related to the bearing housing.

14 Claims, 9 Drawing Sheets

FIBER-OPTIC BASED THRUST LOAD MEASUREMENT SYSTEM

BACKGROUND

This invention relates generally to gas turbine engines and, more specifically, to measuring a bearing thrust load on gas turbine engine bearing assemblies.

At least some known gas turbine engines include rotating compressors and turbines. The rotating compressors and turbines are supported within a case by bearing assemblies. During operation, thrust loads may be induced to the bearing assemblies that damage and/or reduce an operational life of such bearing assemblies. Accordingly, bearing thrust forces are sometimes monitored to determine if such forces are high enough to damage and/or reduce the operational life of such bearing assemblies.

Bearing thrust loads are sometimes measured using strain gages secured to races of the bearing assemblies. For example, the strain gages are sometimes calibrated in a laboratory and thereafter installed in the bearing races. At least some known bearing races may need to be reworked so that the gages can be securely engaged to the races. However, reworking bearing surfaces and calibrating each strain gage may be time consuming and difficult.

At least some known strain gage configurations for measuring bearing thrust loads include leadout wires that are routed through static structures of the gas turbine engine to a power source and measurement circuit. If the wires are incorrectly connected to the measurement circuit, the thrust readings can be reversed, i.e., the thrust load may be indicated as being in a direction opposite the direction of the actual thrust load. Also, with the above described strain gage configuration, the leadout wires secured to the internal engine surfaces may work loose or fracture due to fatigue over time, possibly resulting in a loss of signal.

In addition, the strain gage readout may be dependent upon temperature correction. To compensate for temperature affects on the gages, it may be necessary to mount temperature sensors in the region of the strain gages, which may add complexity to the installation and measurement.

Monitoring the health of a thrust bearing in real-time is a demonstrated means for predicting bearing failure. Preventing a bearing failure is worth millions of dollars in engine downtime.

SUMMARY OF THE INVENTION

In one aspect, an apparatus comprises a bearing housing; and a fiber-optic based thrust measurement system mounted to the bearing housing, the measurement system comprising a fiber optic sensor configured to detect one or more parameters related to the bearing housing.

In another aspect, a fiber-optic based thrust load measurement system is operably coupled to a bearing housing. The measurement system comprises a fiber optic sensor configured to detect one or more parameters related to the bearing housing; an optical coupler configured to regulate light signals emitted from a light source and light signals reflected from the fiber optic sensor; a detector system configured to receive light signals from the optical coupler; and a processor configured to receive an output from the detection system and to determine a thrust load on a thrust bearing based on the detected one or more parameters related to the bearing housing.

In another aspect, a method comprises:
directing light from a light source to a plurality fiber optic sensors disposed in a bearing housing;
receiving reflected light from the fiber optic sensors using a detector system; and determining one or more parameters related to the bearing housing comprising temperature, strain, pressure, vibration, or combinations thereof based on shift in wavelength of light reflected from the fiber optic sensors

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
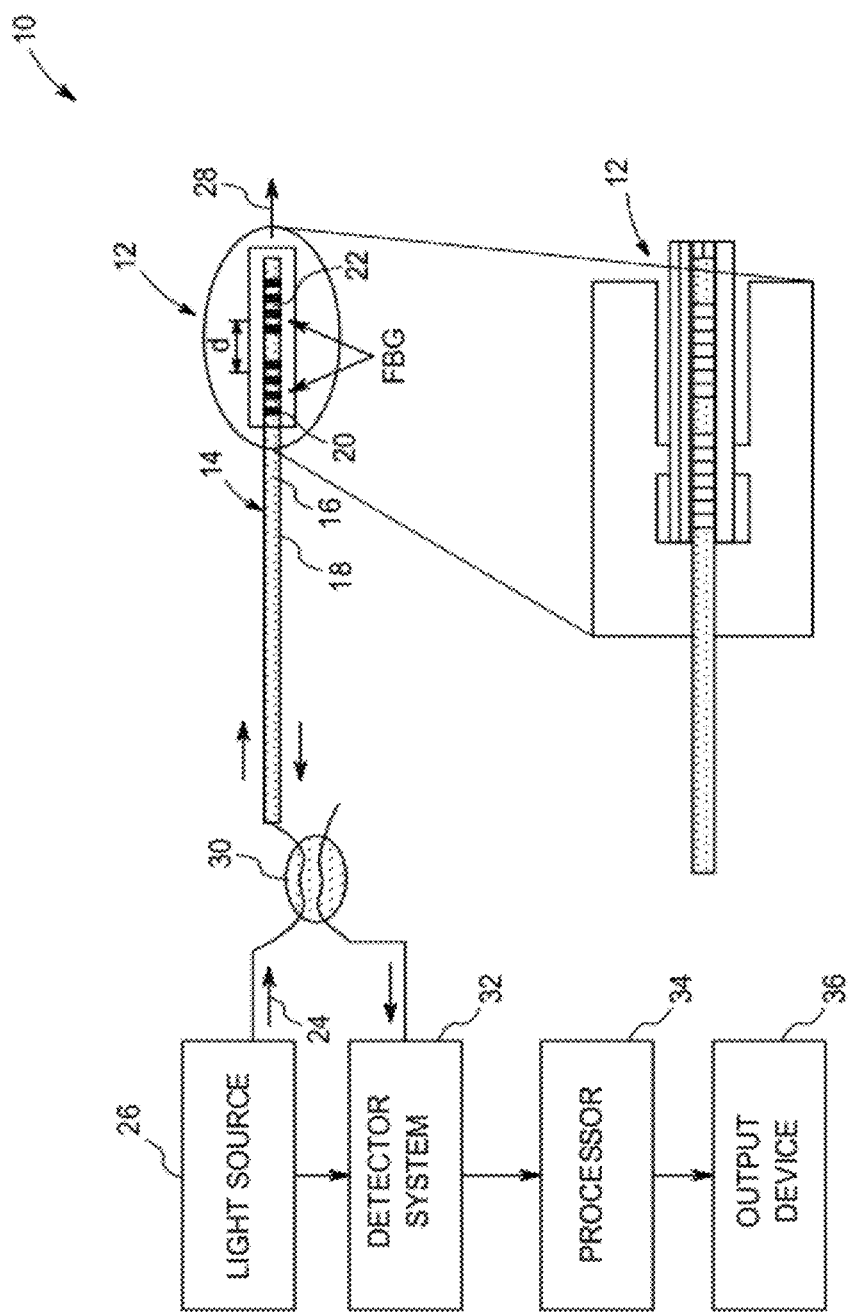
FIG. 1 is a diagrammatical view of a fiber optic measurement system in accordance with an exemplary embodiment of the present invention.

FIG. 1 is a diagrammatical view of a fiber-optic based thrust load measurement system 10 in accordance with an exemplary embodiment of the invention. The system 10 includes one or more fiber optic sensors 12. Each sensor 12 includes a fiber optic cable 14 having aperiodic refractive index modulation. The fiber optic cable 14 includes a core 16 and a cladding 18 that is disposed circumferentially about the core 16. A series of grating elements 20, 22 are spaced apart by a predetermined distance "d" and disposed within the core 16 and are configured to reflect in phase, wavelengths of light corresponding to a grating period of the grated elements 20, 22. The cladding 18 provides for near total internal reflection of light within the cable 14, thereby allowing light to be transmitted by and axially through the cable 14. The plurality of grating elements 20, 22 have an index of refraction different that of core 16. Although only two grating elements 20, 22 are illustrated, in other embodiments, more than two grating elements may be used. During operation, an input light 24 signal is provided from a light source 26 to the cable 14 and a portion of the input light 24 is reflected by the grating elements 20, 22 in phase and corresponding to certain wavelengths of light, while remaining wavelengths are transmitted as represented by a transmitted signal 28. The index of refraction of the grating elements 20, 22 and distance between the grating elements 20, 22 define the wavelength of light reflected in phase by the grating elements 20, 22.

The measurement system 10 also includes an optical coupler 30 configured to regulate the input light 24 from the light source 26 and also the reflected signals from the cable 14. The optical coupler 30 directs the appropriate reflected signals to a detector system 32, such as a photo detector system, and the like. The detector system 32 receives the reflected optical signals from the cable 14 and provides an output signal to a processor 34. The processor 34 is configured to analyze the embedded information in the output signal from the detector system 32 and estimate a condition of a plurality of parameters of a bearing housing (not shown in FIG. 1) based upon a diffraction peak generated from the plurality of grating elements 20, 22 of the cable 14. Parameters may include temperature, strain, pressure, vibrations, or the like. The exemplary cable 14 generates multiple strong diffraction peaks, thereby facilitating segregation of various parameters. In the illustrated embodiment, the first grating element 20 is configured to reflect a first wavelength of light in phase. The reflected optical signal from the grating element 20 may be indicative of temperature of the bearing housing. Also, the second grating element 22 is configured to reflect a second wavelength of light in phase. The reflected optical signal from the grating element 22 may be indicative of strain on the bearing housing. In one example, the grating element 22 may be an apodized short period grating. An output signal indicative of the parameters of the bearing housing may be transmitted from the processor 34 to an output device 36, such as a controller, personal computer, personal device, laptop, or server. The output information may be used to address concerns or effectuate changes in the bearing housing.

Figure 2:
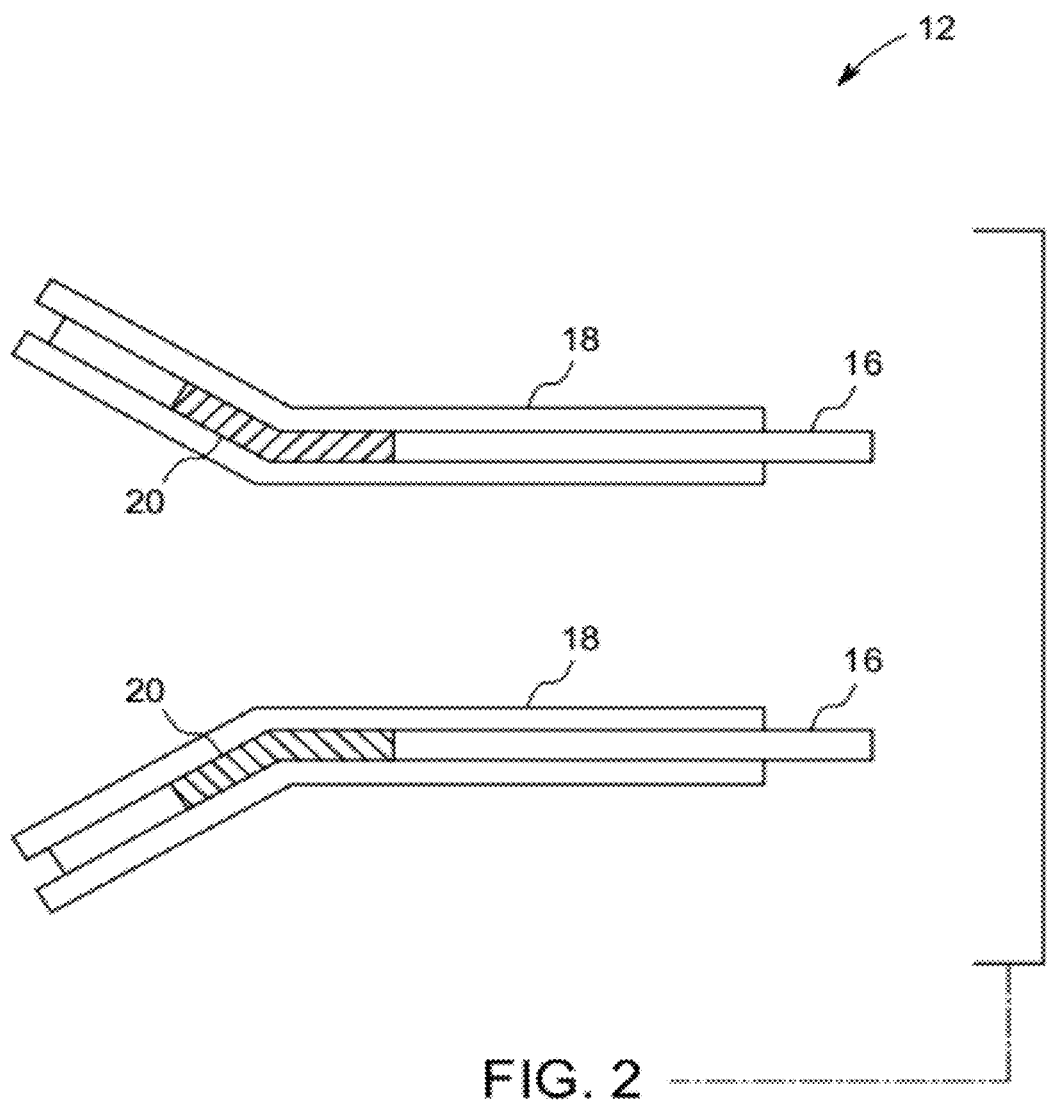
FIG. 2 is a diagrammatical view of a tilted (strained) optical fiber Bragg grating-based sensor indicating tensile and compressive strain in accordance with aspects of FIG. 1.

Referring to FIG. 2, a fiber optic sensor 12 is shown in accordance with an exemplary embodiment of the present invention is illustrated. In the illustrated embodiment, the sensor 34 includes the grating element 20. In this embodiment, the grating element 20 is a tilted short-period grating element with Gaussian profile apodization. In one embodiment, the element may be tilted 2 to 5 degrees relative to a horizontal axis of the sensor 12. In another embodiment, the short-period Bragg grating element may have an apodized profile and periodic refractive index modulation along the fiber core axis. As discussed above, during operation, an input light signal is provided from the light source to the sensor cable and a portion of the input light signal is reflected by the Bragg grating element 20 in phase and corresponding to a certain wavelength of light. The exemplary sensor utilize a wavelength encoding within the core 16 to measure a parameter based upon a Bragg resonant wavelength shift that is determined by the product of the effective core refractive index and periodicity of the grating modulation. In the illustrated example, the grating element 20 may be tilted upwards when there is a tensile strain at the bearing housing during operation of the turbine. This tensile strain may result in an upward shift in wavelength of light reflected from the element 20. Tensile strain may be detected based on the upward shift in wavelength of reflected light signal. Also, the grating element 20 may be tilted downwards when there is a compressive strain at the seal-rotor interface during operation of the turbine. This compressive strain may result in a downward shift in wavelength of light reflected from the element 20. Compressive strain may be detected based on the downward shift in wavelength of reflected light signal. Similarly, in other embodiments, one or more parameters may be detected based on shift in wavelength of light signals reflected from plurality of grating elements. The exemplary sensors facilitate distributed sensing of multiple parameters and are capable of withstanding harsh environmental conditions such as elevated temperatures and high pressures, for example. It should be noted herein that grating elements providing indication of temperature, strain, pressure, vibration, or the like may either be collocated or in separate sensor cables.

Figure 3:
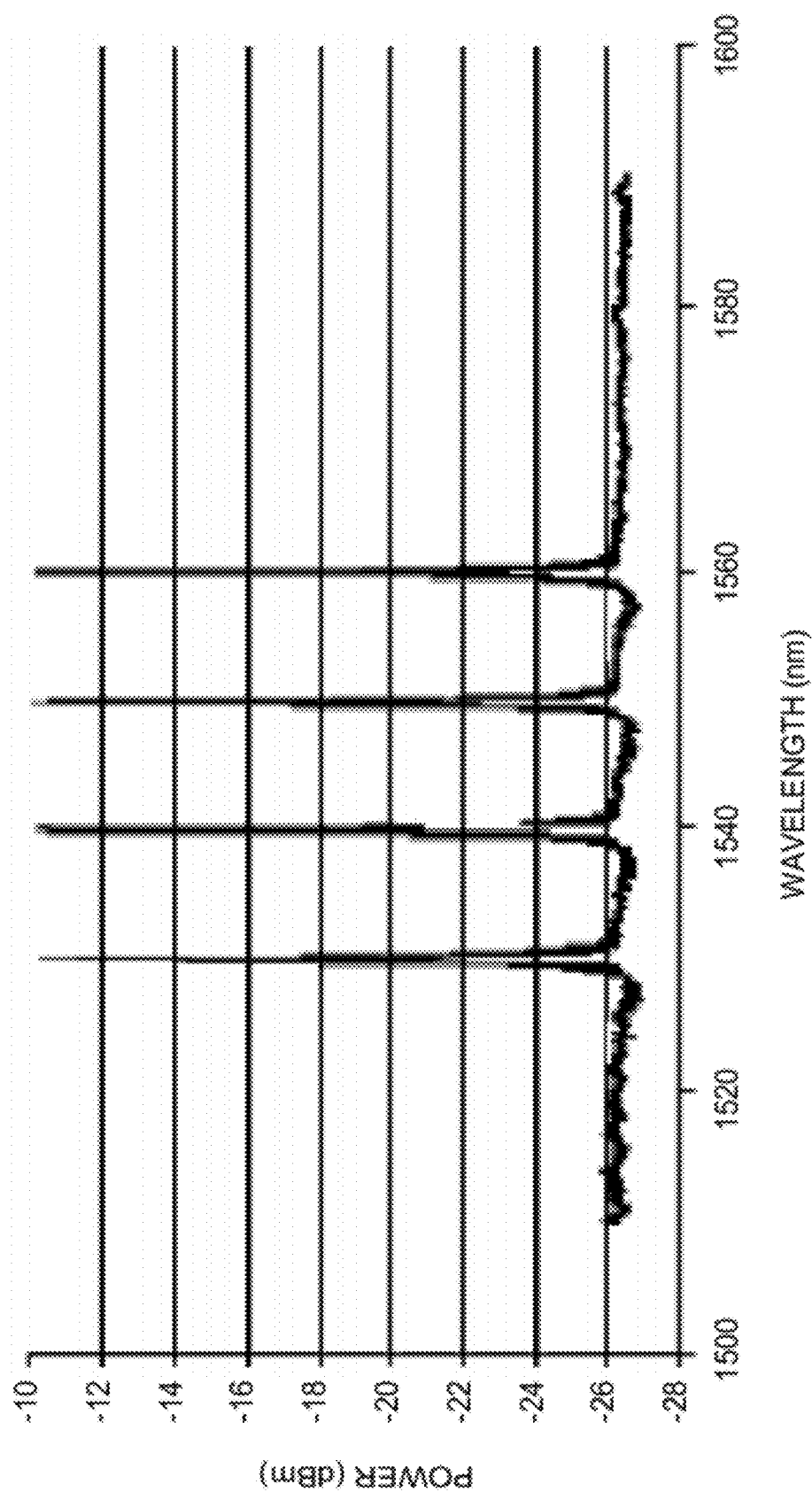
FIG. 3 represents the temperature sensing array's reflected power spectra from four fiber Bragg gratings in accordance with an exemplary embodiment of the invention.

Referring to FIG. 3, reflectance from a sensing array having four short-period Bragg grating elements is illustrated in accordance with an exemplary embodiment of the present invention. The illustrated figure represents variation of power expressed in decibels above 1 milliwatt versus (dBm) wavelength expressed in nanometers (nm). In the exemplary embodiment, a central wavelength of a first grating element may be approximately 1530 nm, and the separation between grating elements may be approximately 10 nm. The dynamic range of the temperature-sensing array is about 15 dB. It should be noted herein that the illustrated figure is an exemplary embodiment, and the sensor number and their wavelength interval may vary depending upon the application.

Figure 4:
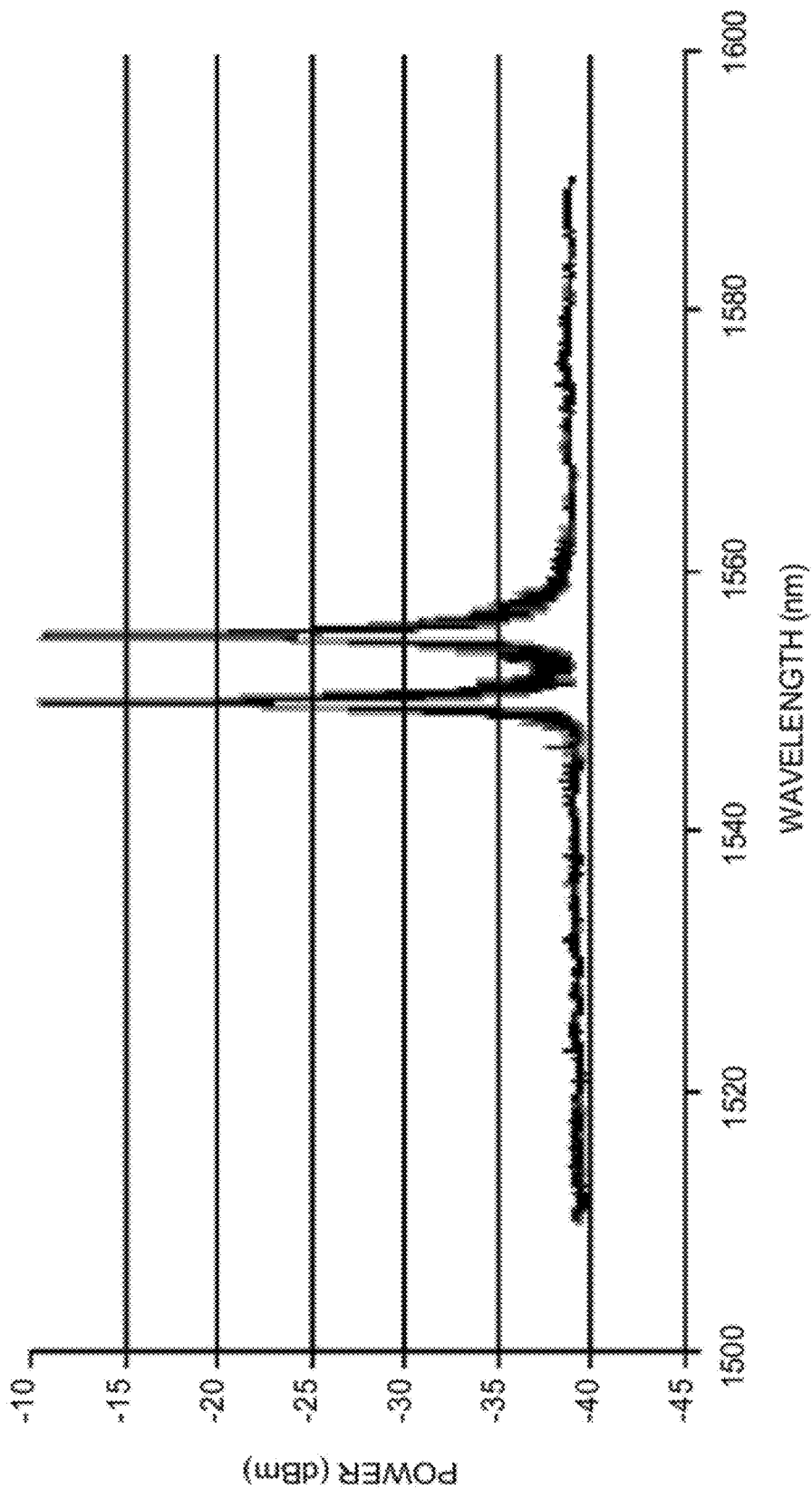
FIG. 4 represents a reflected power spectra from temperature and strain fiber Bragg grating-based sensors in accordance with an exemplary embodiment of the invention.

Referring to FIG. 4, reflectance measurement from two fiber Bragg grating elements is illustrated in accordance with an exemplary embodiment of the present invention. The illustrated figure represents variation of power expressed in decibels above 1 milliwatt (dBm) versus wavelength expressed in nanometers (nm). In the illustrated embodiment, one grating element is configured for sensing temperature, and other grating element is configured for sensing strain or vibration. The separation between two sensors may be approximately 5 nm. In the rotor-seal interface, although both sensors may simultaneously respond to thermal variation, only the strain sensor responds to both thermal and mechanical strain. The absolute strain is calculated by differentiating the thermal-induced wavelength shift from the strain sensor's response. It should be noted herein again that the illustrated figure is an exemplary embodiment, and the sensor number and their wavelength interval may vary depending upon the application.

Figure 5:
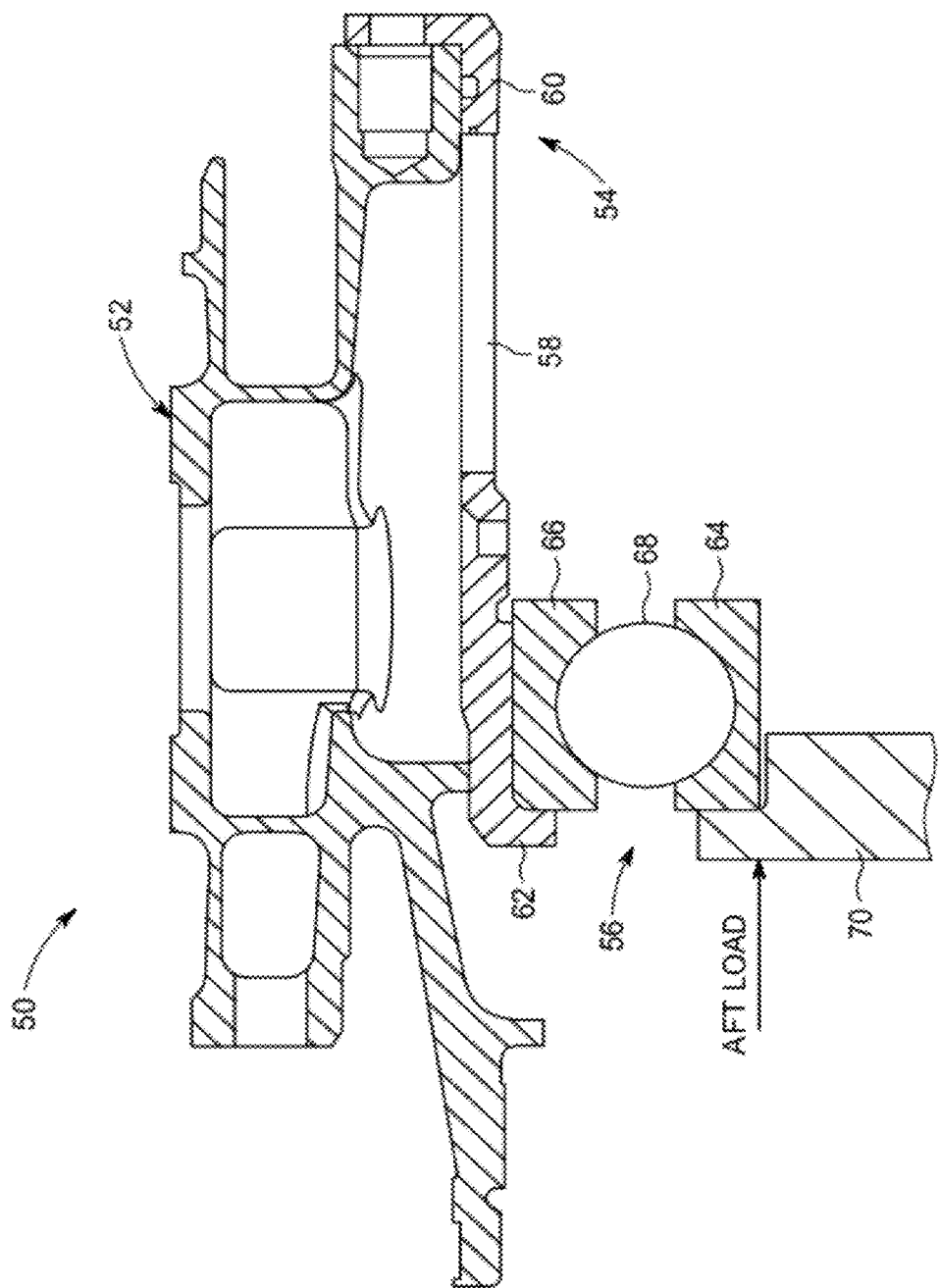
FIG. 5 is a side view of an exemplary engine bearing in which the fiber optic sensor shown in FIG. 1 may be utilized.

FIG. 5 is an isometric side view, partially in cross section and with parts cut away, of an exemplary engine bearing housing 50 in which the fiber optic sensor 12 (shown in FIG. 1) may be utilized. The bearing housing 50 includes a sump housing 52 and a bearing support bracket 54 extending from the sump housing 52 to support a bearing assembly 56. A plurality of finger supports 58, sometimes referred to herein as fingers, extend between portions 60 and 62 of the bracket 54. Only one such finger 58 is shown in FIG. 2. The bearing assembly 56 includes an inner race 64 and an outer race 66, and a ball (or thrust) bearing 68 is positioned between races 64 and 66. A rotating component 70 is secured to the inner race 64, and as the component 70 and the inner race 64 rotate, loads (e.g., an aft load force direction is shown in FIG. 5) are exerted on the bearing assembly 56. In some embodiments, a plurality of guides (not shown) may be located around the circumference of the bearing housing 50 to provide guidance for the fiber optic cables 14 that connect each fiber optic sensor 12 to the optical coupler 30.

The fiber optic sensor 12 may be mounted to the bearing housing in any suitable configuration, arrangement, fashion, and/or by any suitable structure and/or means. For example, the fiber optic sensor 12 can be operably coupled to any part of the bearing housing 50 or can be operably coupled to a structural member and any number of intermediate structural members operably coupled to the bearing housing 50 that are capable of transmitting the loading (or deflection) from the bearing housing 50 to the fiber optic sensor 12. In other words, the fiber optic sensor 12 can be operably coupled directly to the bearing housing 50, or the fiber optic sensor 12 can be operably coupled to a structural member, which in turn, is operably coupled to any number of intermediate structural member(s) located between that fiber optic sensor 12 and the bearing housing 50 that are capable of transmitting the loading (or deflection) from the bearing housing portion 60 to the fiber optic sensor 12.

Figure 6:
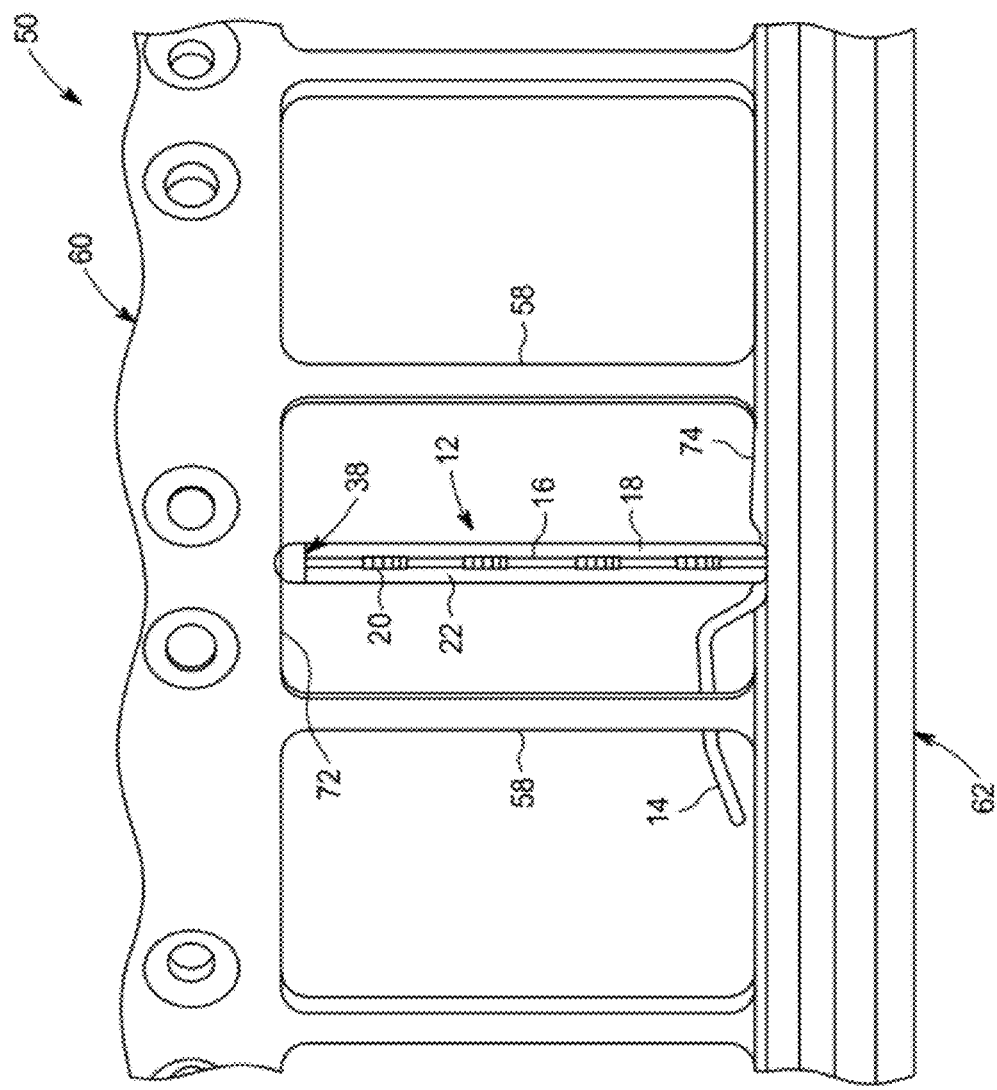
FIG. 6 is a perspective view of the bearing rotor thrust assembly shown in FIG. 1 secured to the engine bearing shown in FIG. 5.

FIG. 6 shows an exemplary embodiment in which the fiber optic sensor 12 is operably coupled to the bearing housing 50 by securing the fiber optic sensor 12 between adjacent fingers 58 of the bearing housing portion 60. In the illustrated embodiment, the fiber optic sensor 12 is generally parallel to the housing fingers 58. Specifically, one end of the fiber optic sensor 12 is positioned adjacent an opening 72 within the bearing housing portion 60, and the other end of the fiber optic sensor 12 is positioned adjacent an opening 74 within the bearing housing portion 62. A means for adjusting a length of the fiber optic sensor 12 is located on one or both ends of the sensor 12. In the illustrated embodiment, the adjusting means is a turnbuckle 38. Using the turnbuckle 38 positioned on one or both ends of the fiber optic sensor 12, the length of the fiber optic sensor 12 is adjusted such that the fiber optic sensor 12 is fixedly secured within the openings 72, 74 of the bearing housing 50.

As the bearing housing 50 is put into either tensile or compressive loading, an axial dimension of the housing 50 is changed, for example from about 0 to +/− about several mils. This axial dimensional change of the bearing housing 50 causes a loading (or deflection) on the fiber optic sensor 12. The loading (or deflection) on the fiber optic sensor 12 causes a shift in the wavelength of light reflected by the fiber optic sensor 12. By detecting the shift in the wavelength of the light reflected from the fiber optic sensor 12, the loading on the bearing housing 50 can be detected by the detector system 32 and determined by the processor 34.

Figure 7:
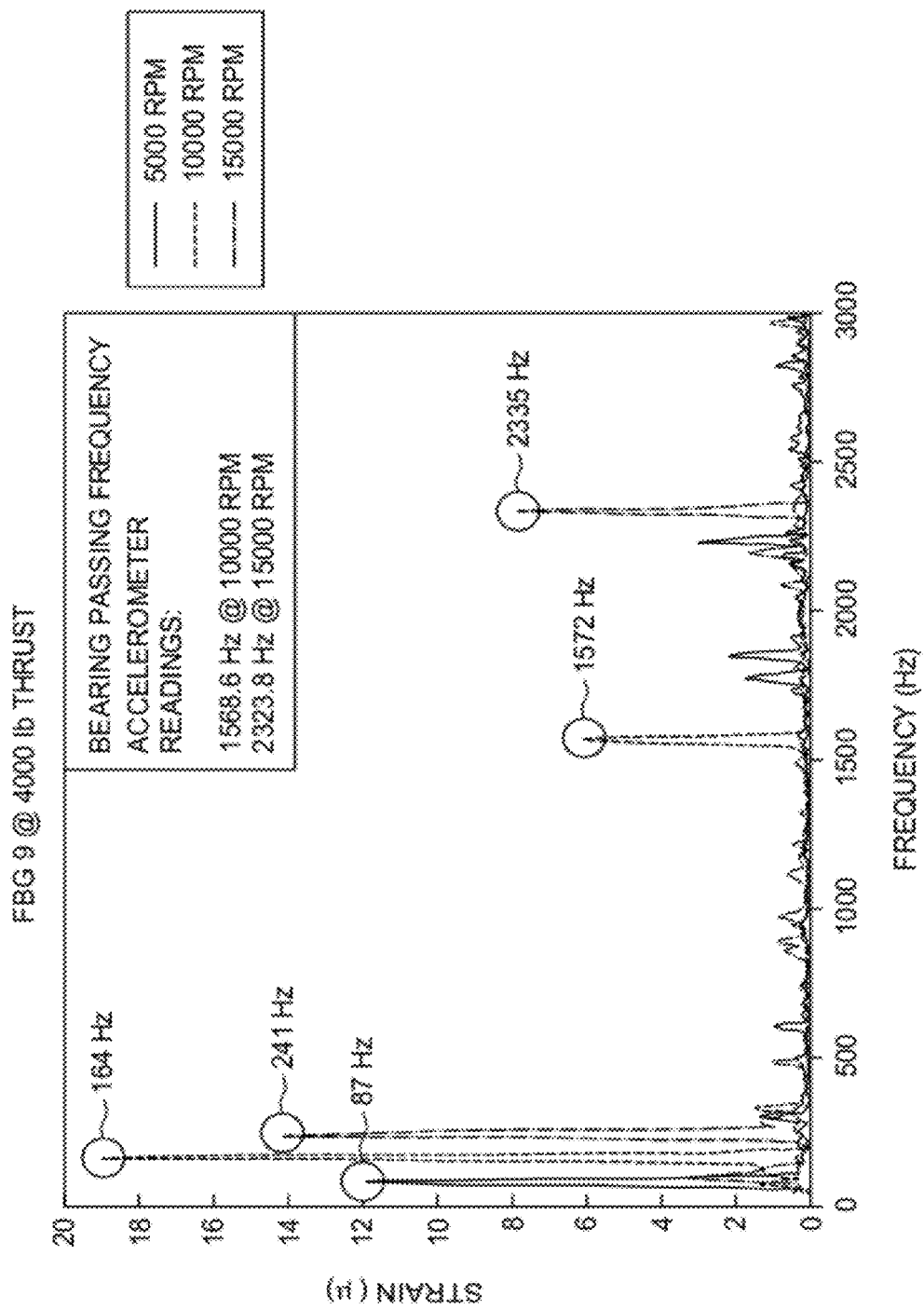
FIG. 7 represents a dynamic strain response from a strain fiber optic Bragg grating-based sensor in accordance with an exemplary embodiment of the invention.

Referring now to FIG. 7, a dynamic strain response from a Bragg grating-based fiber optic sensor 12 is illustrated in accordance with an exemplary embodiment of the invention. The illustrated figure represents variation of strain versus vibration frequency expressed in Hertz (Hz) under a bearing thrust load of about 4000 lb. At a predetermined rotational speed of the bearing housing 50 of about 5000 rpm, 10000 rpm and 15000 rpm, when a thrust bearing 68 passes in the vicinity of the sensor 12, there is a change in strain in the bearing housing 50. In the illustrated example, the bearing passing frequency was measured by the fiber optic sensor 12 to be approximately 1572.0 Hz at about 10000 rpm, and approximately 2335.0 Hz at about 15000 rpm, as compared to accelerometer readings of approximately 1568.8 Hz and approximately 2323.8 Hz, respectively. In other words, the bearing passing frequency measured by the fiber optic sensor 12 had less than a about 1% deviation as compared to measurements from accelerometers mounted to the bearing housing 50. In addition, the fiber optic sensor 12 detected excited harmonics at frequencies of approximately 87 Hz, approximately 164 Hz and approximately 241 Hz. It should be noted herein that the illustrated example is an exemplary embodiment and should not be construed as limiting the scope of the invention.

Figure 8:
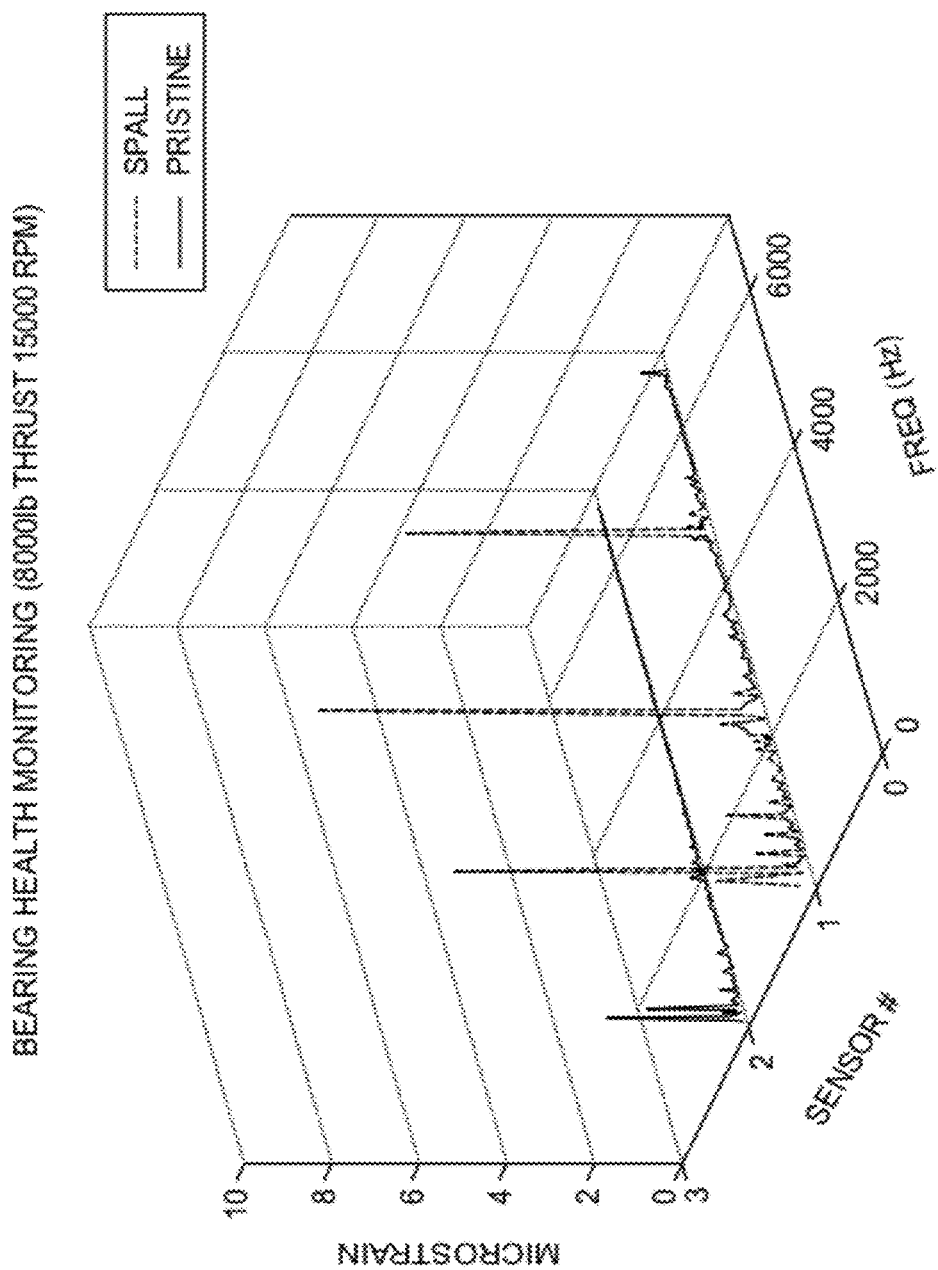
FIG. 8 represents a dynamic strain response from a plurality of strain fiber Bragg grating-based sensors in accordance with an exemplary embodiment of the present invention.

Referring now to FIG. 8, a dynamic strain response from a pair of Bragg grating-based fiber optic sensors 12 is illustrated in accordance with an exemplary embodiment of the invention. The illustrated figure represents variation of strain versus vibration frequency expressed in Hertz (Hz) under a bearing thrust load of about 8000 lb and a rotational speed of about 15000 rpm. In the illustrated example, the fiber optic sensors 12 detected distinctly different vibration signatures between a bearing 68 that is pristine, i.e., no spall, as compared to a bearing 68 with spall. This figure confirms that the fiber-based thrust load measurement system 10 can be used to monitor the health of the bearing 68 in the bearing housing 50.

Figure 9:
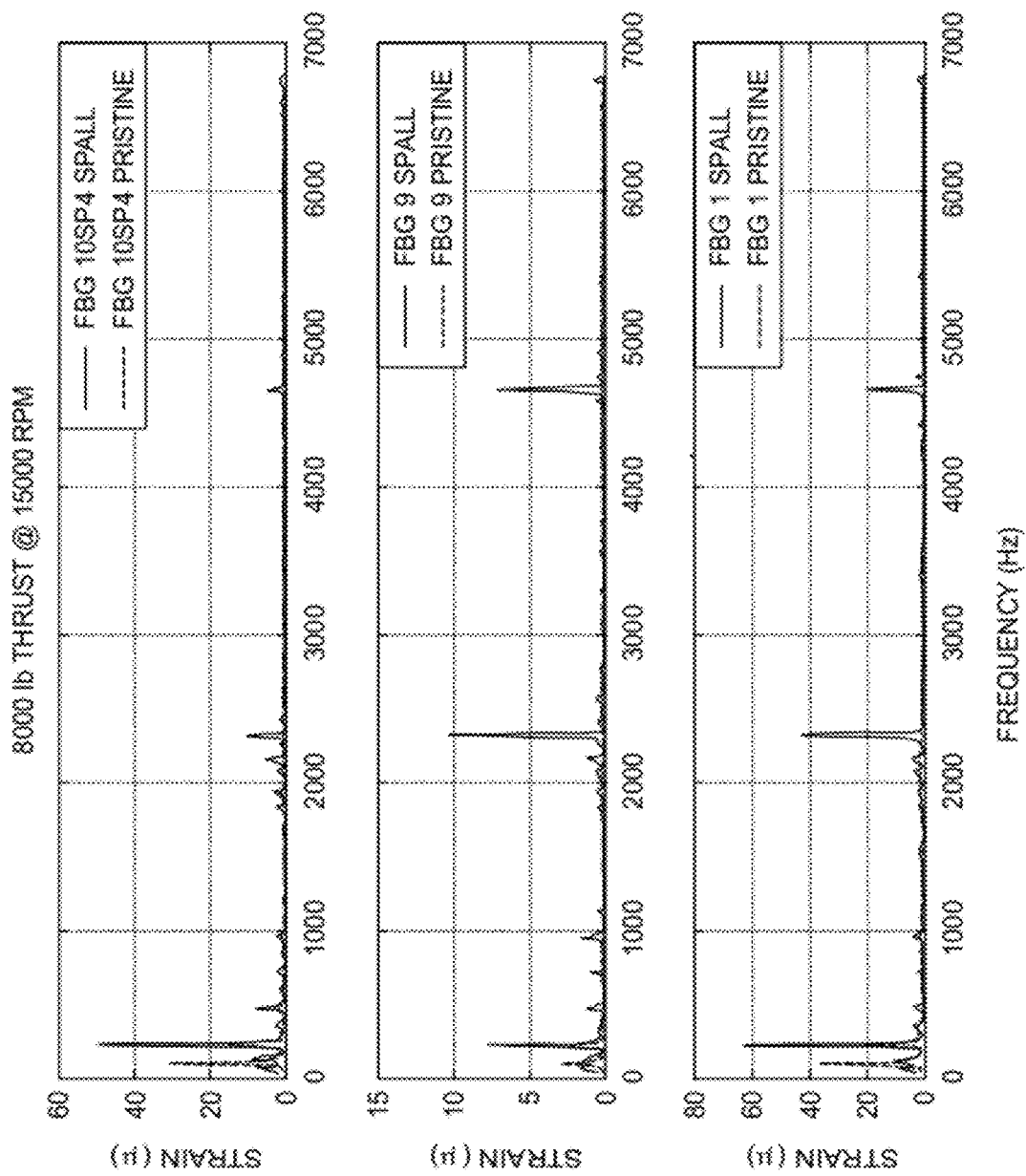
FIG. 9 is a diagrammatical view of a system for measuring and controlling thrust load on a rotor bearing of a rotary machine in accordance with an exemplary embodiment of the present invention.

Referring now to FIG. 9, a dynamic strain response from a plurality of Bragg grating-based fiber optic sensors 12 is illustrated in accordance with an exemplary embodiment of the invention. The illustrated figure represents variation of strain versus vibration frequency expressed in Hertz (Hz) under a bearing thrust load of about 8000 lb and a rotational speed of about 15000 rpm. In the illustrated example, the fiber optic sensors 12 detected distinctly different vibration signatures between a bearing 68 that is pristine, i.e., no spall, as compared to a bearing 68 with spall. Similar to FIG. 8, this figure confirms that the fiber-based thrust load measurement system 10 can be used to monitor the health of the bearing 68 in the bearing housing 50.

As described above, the fiber-based thrust load measurement system 10 can be utilized for measuring bearing thrust loads in a gas turbine engine and may be less difficult and/or time-consuming to install in both development and production engines as compared to known strain gage assemblies. For example, because the fiber-optic sensor 12 is mounted directly to bearing housing 50, rather than to bearing races, the need for reworking the bearing races to install sensors may be eliminated. Moreover, the fiber-optic sensor 12 may be secured to bearing housing 50 without using an adhesive. As such, the fiber-optic sensor 12 may facilitate reducing the time and/or costs associated with measuring bearing thrust loads. Further, the measurement system 10 eliminates several electronic components required for measuring bearing thrust loads.

The assemblies, bearings, and methods described and/or illustrated herein are described and/or illustrated herein in connection with a specific assembly for being secured to a bearing housing of a gas turbine engine. However, it should be understood, that such sensing elements could be used in many alternative securing arrangements. Therefore, the manner of securing the sensing element to the bearing housing is an exemplary configuration and the sensing element could be used in connection with other securing assemblies.

Exemplary embodiments of assemblies, bearings, and methods are described and/or illustrated herein in detail. The assemblies, methods, and bearings are not limited to the specific embodiments described and/or illustrated herein, but rather, components of each assembly and bearing, as well as steps of each method, may be utilized independently and separately from other components and/or steps described and/or illustrated herein. Each component and/or step can also be used in combination with other components and/or steps.

When introducing elements/components/etc. of the assemblies, bearings, and methods described and/or illustrated herein, the articles "a", "an", "the" and "said" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An apparatus, comprising:
   a bearing housing; and
   a fiber-optic based thrust load measurement system operably coupled to the bearing housing, the measurement system comprising a fiber optic sensor configured to detect one or more parameters related to the bearing housing,
   wherein the bearing housing further comprises a plurality of fingers extending between a pair of opposite bearing housing portions.

2. The apparatus according to claim 1, wherein the bearing housing further comprises a sump housing and a bearing support bracket extending from the sump housing to support the bearing assembly.

3. The apparatus according to claim 1, wherein one end of the fiber optic sensor is positioned adjacent an opening within one of the bearing housing portions, and the other end of the fiber optic sensor is positioned adjacent an opening within the other one of the bearing housing portions.

4. An apparatus, comprising:
   a bearing housing; and
   a fiber-optic based thrust load measurement system operably coupled to the bearing housing, the measurement system comprising a fiber optic sensor configured to detect one or more parameters related to the bearing housing; and
   means for adjusting a length of the fiber optic sensor.

5. The apparatus according to claim 4, wherein the adjusting means comprises a turnbuckle.

6. An apparatus, comprising:
   a bearing housing; and
   a fiber-optic based thrust load measurement system operably coupled to the bearing housing, the measurement system comprising a fiber optic sensor configured to detect one or more parameters related to the bearing housing,
   wherein the fiber optic sensor comprises a plurality of fiber Bragg grating elements.

7. An apparatus, comprising:
   a bearing housing; and
   a fiber-optic based thrust load measurement system operably coupled to the bearing housing, the measurement system comprising a fiber optic sensor configured to detect one or more parameters related to the bearing housing,
   wherein the fiber-optic based thrust load measurement system further comprises an optical coupler configured to regulate light signals emitted from a light source and light signals reflected from the fiber optic sensor.

8. The apparatus according to claim 7, wherein the fiber-optic based thrust load measurement system further comprises a detector system configured to receive light signals from the optical coupler.

9. The apparatus according to claim 8, wherein the fiber-optic based thrust load measurement system further comprises a processor configured to receive an output from the detection system and to determine a thrust load on a thrust bearing based on the detected one or more parameters related to the bearing housing.

10. A fiber-optic based thrust load measurement system mounted to a bearing housing, the measurement system comprising:
    a fiber optic sensor configured to detect one or more parameters related to the bearing housing;
    an optical coupler configured to regulate light signals emitted from a light source and light signals reflected from the fiber optic sensor;
    a detector system configured to receive light signals from the optical coupler; and
    a processor configured to receive an output from the detector system and to determine a thrust load on a thrust bearing based on the detected one or more parameters related to the bearing housing.

11. The system according to claim 10, wherein the fiber optic sensor comprises a plurality of fiber Bragg grating elements.

12. The system according to claim 10, further comprising means for adjusting a length of the fiber optic sensor.

13. The system according to claim 12, wherein the adjusting means comprises a turnbuckle.

14. A method for detecting one or more parameters related to a bearing housing, comprising:
    directing light from a light source to a plurality fiber optic sensors coupled to the bearing housing;
    receiving reflected light from the fiber optic sensors using a detector system;
    determining one or more parameters related to the bearing housing; and
    determining a thrust load on a thrust bearing based on the detected one or more parameters related to the bearing housing.

* * * * *

UNITED STATES PATENT AND TRADEMARK OFFICE
CERTIFICATE OF CORRECTION

PATENT NO. : 8,314,925 B2  
APPLICATION NO. : 12/609546  
DATED : November 20, 2012  
INVENTOR(S) : Ruggiero et al.

Page 1 of 1

It is certified that error appears in the above-identified patent and that said Letters Patent is hereby corrected as shown below:

On the Face Page, in Field (12), under "United States Patent", in Column 1, Line 1, delete "Rubbiero" and insert -- Ruggiero --, therefor.

On the Face Page, in Field (75), under "Inventors", in Column 1, Line 1, delete "Rubbiero," and insert -- Ruggiero, --, therefor.

Signed and Sealed this
Twelfth Day of February, 2013

Teresa Stanek Rea
*Acting Director of the United States Patent and Trademark Office*